Feb. 22, 1944.   R. C. PRYOR   2,342,367
BOTTOM HOLE OR SUBSURFACE SAMPLER
Filed Feb. 17, 1941   3 Sheets-Sheet 1

INVENTOR
ROBERT C. PRYOR
BY
ATTORNEY

Feb. 22, 1944.    R. C. PRYOR    2,342,367
BOTTOM HOLE OR SUBSURFACE SAMPLER
Filed Feb. 17, 1941    3 Sheets-Sheet 2

INVENTOR
ROBERT C. PRYOR
BY
ATTORNEY

Patented Feb. 22, 1944

2,342,367

UNITED STATES PATENT OFFICE 2,342,367

BOTTOM HOLE OR SUBSURFACE SAMPLER

Robert C. Pryor, Bartlesville, Okla., assignor to Phillips Petroleum Company, a corporation of Delaware Application February 17, 1941, Serial No. 379,355

9 Claims. (Cl. 166—19)

This invention relates to a device for obtaining fluid samples and more particularly to a device for obtaining fluid samples from well bores.

In recent years, the petroleum industry has come to a full realization of the importance of obtaining accurate data regarding hydrocarbon-bearing reservoirs. The determination, interpretation, and application of this data is commonly known by the broad term, reservoir engineering. Among the data pertinent to reservoir engineering, are drilling logs, formation sample logs, core records, electrical survey logs, and reservoir fluid characteristics. With these and other data, the reservoir engineers can predict the future recovery of hydrocarbon fluids and determine what methods of production will recover the maximum quantity of hydrocarbon fluid from the reservoir.

In the data enumerated above, the reservoir fluid characteristics are especially useful in predicting the behavior of the fluid in a hydrocarbon-bearing reservoir during the productive life of the reservoir. It is to be noted that hydrocarbon oil and gas produced at the surface of the ground has an entirely different set of physical characteristics at normal atmospheric pressure and temperature than the same oil and gas has in the reservoir at superatmospheric pressure and temperature. Hence, it is very desirable to obtain fluid samples which are truly representative of reservoir conditions.

The art of obtaining bottom hole samples of hydrocarbon fluids and transferring the sample unchanged from the sampler to laboratory apparatus for study, is generally known in the industry. Considerable difficulty has been experienced in the past in obtaining a truly representative reservoir sample of hydrocarbon fluid. The devices which are now available to the industry for obtaining bottom hole samples have faulty design and construction, whereby the escape of gas or liquid from the sampler makes the remaining sample of fluid non-representative of the reservoir.

My instant invention is designed to prevent the escape of gas or liquid from the sampler. The sampler is positive in action and simple in operation, requiring no auxiliary equipment, such as clocks, vacuum pumps, batteries, discs, and the like.

My invention has for its primary object the provision of an improved device for obtaining fluid samples and more particularly for obtaining fluid samples from well bores.

Another object of my invention is the provision of a sampling device for obtaining representative subsurface or bottom hole samples of hydrocarbon fluids.

A further object of my invention is the provision of a sampling device which is positive in action and simple in operation.

These and additional objects and advantages will be apparent to persons skilled in the art by reference to the following description and annexed drawings; wherein, Figure 1 is an elevation view, partly in cross section, of the upper portion of the invention in open position;

Figure 1:
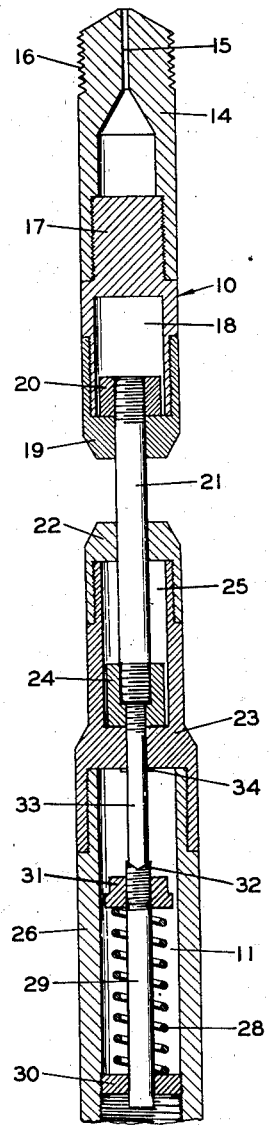
Figure 2:
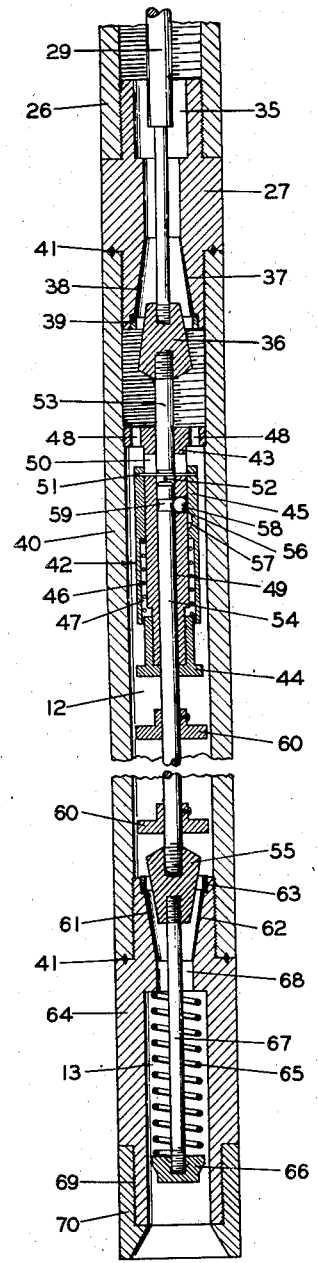
Figure 2 is an elevation view, partly in cross section, of the lower portion of the invention in open position.

Referring to the drawings and more particularly to Figures 1 and 2, I have shown a device consisting of a jarring member 10 and three chambers, namely, a top spring chamber 11, a fluid chamber 12, and a bottom spring chamber 13. Member 10 includes a "fishing head" 14 having a central bore 15 that is adapted to receive a wire line or cable (not shown) by which my device is lowered into or withdrawn from a well bore. Suitable notches 16 are provided on the external periphery of the fishing head to facilitate recovery of the device in event that it becomes lost or stuck in the well bore. The fishing head is threadedly connected to the upper portion of a plug 17. The plug has a lower central bore 18 which is provided with a cap 19. An element 20 contained in bore 18 is threadedly connected to the top of a rod 21 that slides freely through cap 19 and through a second cap 22 which has internal threads for attachment to the upper portion of a mandrel 23. Another element 24, positioned in a bore 25 of the mandrel, is threadedly connected to the bottom of the rod. It is to be noted that rod 21, elements 20 and 24, and caps 19 and 22 provide a means for connecting jarring member 10 to the rest of the device.

The top spring chamber 11 is formed by the interior of a tubular member 26 which is externally threaded at its upper end to receive the bottom portion of mandrel 23 and which is internally threaded on its lower end to engage the top part of a valve member 27. A compression spring 28 of any desired strength is contained within tubular member 26. This spring is concentric with an upper valve stem 29 and is positioned intermediate a partition 30 and a collar 31 which is secured to the valve stem. It will be noted that the top of stem 29 is at 32 where it contacts another stem 33. Stem 33 is threadedly connected to element 24 and carries a removable shear pin 34 which holds stem 33, and hence, stem 29 in a predetermined position against the action of compression spring 28. Valve stem 29 extends downwardly from spring 28 through a passage 35 in valve member 27 and the lower end is attached to an upper valve 36. An upper valve seat 37, which is frustro-conical in shape, is provided in the lower part of passage 35. The valve seat is provided with an insert 38 made of any resilient and readily distortable material. While natural rubber compounds may be employed in some instances, I find that these compounds tend to deteriorate when left for appreciable periods of time in the presence of hydrocarbon fluids. On the other hand, various synthetic rubber compositions, such as duprene and neoprene, are entirely satisfactory for use in my present invention. This particular type of insert will provide a highly effective fluid seal. As the insert is distortable, solid materials, which cling to the surface of the valve and the insert, will be forced into the insert and thus will not hold the valve off its seat. A threaded ring 39 holds insert 38 in place and prevents leakage of fluid between the insert and valve seat 37.

Figure 6:
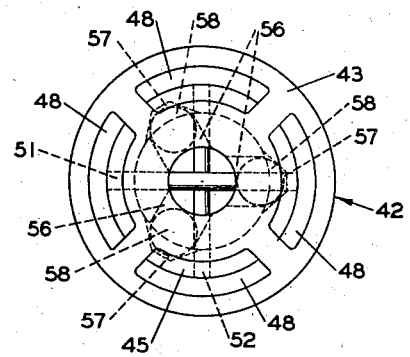
Figure 5:
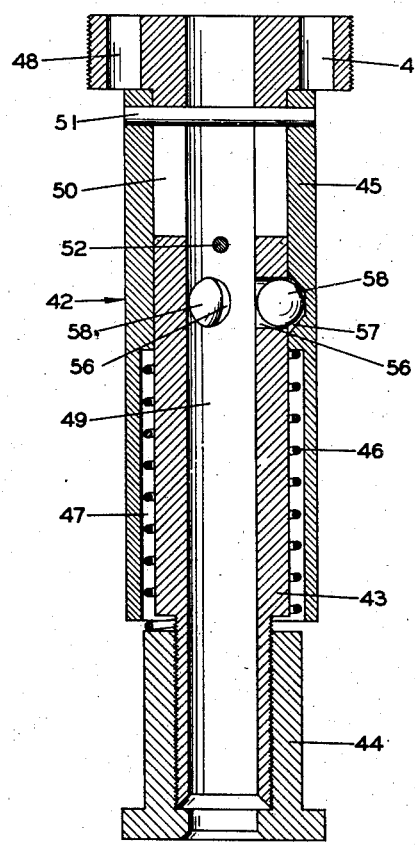
Figure 5 is an enlarged elevation view of the interlocking mechanism, partly in cross section; and, Figure 6 is a top plan view of the interlocking mechanism illustrated in Figure 5.

A tubular member 40, internally threaded at both ends, constitutes the outer wall of fluid chamber 12. A sealing ring 41, preferably composed of aluminum, is provided between tubular member 40 and plug 27 to obtain an effective fluid seal. It will be noted that a similar sealing means is used in other portions of the apparatus. An interlocking valve mechanism 42 is threadedly positioned in chamber 12. The mechanism embodies an inner stationary member 43 which is flanged at the top, a lower element 44 which is threadedly connected to the bottom of the inner member, an outer member 45 which is slidable on the inner member and on lower element 44, and a compression spring 46 which is contained in annular space 47. Referring to the enlarged views of the interlocking mechanism, shown in Figures 5 and 6, it will be noted that the flanged top of inner member 43 is provided with passages 48. Member 43 also has a central vertical passage 49 and a transverse passage 50. A pin 51 which extends diametrically through outer member 45 and passage 50 has a limited slidable movement in the passage. As this pin is secured to the outer member 45, passage 50 limits the movement of the outer member with respect to inner member 43. A stop pin 52 is diametrically disposed through inner member 43 at right angles to pin 51. As shown in Figure 2, a stem 53 is threadedly connected to valve 36 and extends downwardly into passage 49. When this valve is open, the base of the stem rests on pin 51. A second stem 54, which extends upwardly into passage 49, is connected to a lower valve 55 which is identical to valve 36. The design of the interlocking mechanism, as shown in the drawings, includes a plurality of radially disposed circular passages 56 in the inner member, a like number of recesses 57 in outer member 45, and a like number of steel balls 58 which are movable within the aforementioned passages. It will be noted that the length of a passage 56 is slightly less than the diameter of a ball 58. When recesses 57 are opposite passages 56, balls 58 may be urged back through the passages 56 and into recesses 57. Thus, the balls will not protrude into the central passage 49 as they will do when passages 56 and their companion recesses are not opposite to each other. When the relative positions of the inner and outer members of the interlocking mechanism are as shown in Figure 5, stem 54 may be moved upwardly until the top of the stem contacts pin 52. Referring again to Figure 2, you will note that stem 54 is provided with an arcuate groove 59 which is at the same level as passages 56 when the top of the stem is against pin 52. With stem 54 in this position, balls 58 can be protruded into groove 59 by moving the outer member 45 downwardly to a lower fixed position. As outer member 45 can be maintained in the lower fixed position against the force of compression spring 46 by the cooperation of key 34 with mandrel 23, stem 33, valve stem 29, valve 36, stem 53, and pin 51, balls 58 can be protruded through passage 56 to engage groove 59 where the balls prevent stem 54 from moving downwardly.

Open guide means 60 are provided on stem 54 to facilitate the proper seating of valve 55 on a lower valve seat 61. The valve seat is provided with an insert 62 which is held in place by a threaded ring 63. It will be noted that the valve seat, insert, and ring are identical to valve seat 37, insert 38, and ring 39, which have been described above. Valve seat 61 is formed in the upper end of a lower valve member 64 which contains the bottom spring chamber 13. A compression spring 65 of any desired strength is positioned within the chamber between the top of the chamber and a collar 66 which is threadedly connected to the lower end of a lower valve stem 67. The lower valve stem extends upwardly through a passage 68 and is threaded at its upper end to connect with valve 55. The lower end of member 64 is externally threaded at 69 to engage an internally threaded protector ring 70.

Figure 3:
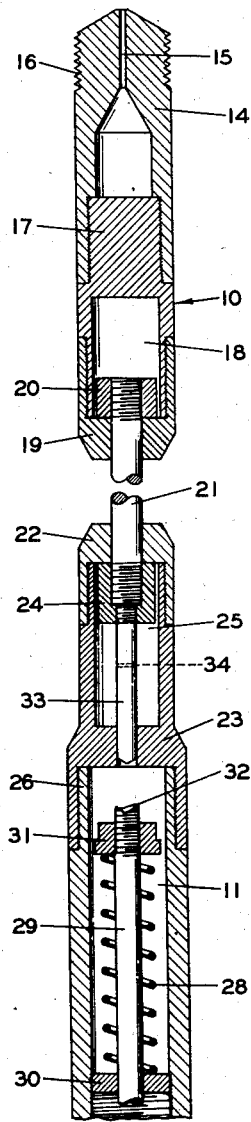
Figure 3 is the same as Figure 1, but with the parts in the position they assume after a sample is obtained.
Figure 4:
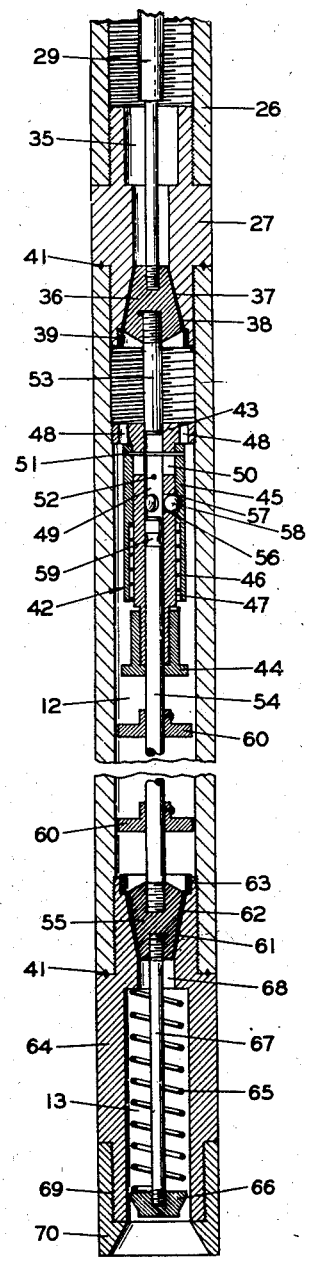
Figure 4 is the same as Figure 2, but with the parts in the position they assume after a sample is obtained.

For the purpose of describing the operation of my invention, let us assume that the device has been assembled and that the relative position of the various parts are as shown in Figures 3 and 4 with valves 36 and 55 closed. In order to obtain a fluid sample, valves 36 and 55 must first be held open as shown in Figures 1 and 2. This is accomplished by setting interlocking mechanism 42. Mandrel 23 with all the parts positioned thereabove is removed from the remainder of the device by unscrewing the lower portion of the mandrel from the upper portion of tubular member 26. Stem 33 is moved downwardly through the mandrel until it assumes the position illustrated in Figure 1 and a shear pin 34 is placed through the stem to thereby limit the upward movement of this stem with respect to the mandrel. Turning next to the bottom of the device, it is recommended that a suitable tool, such as a rod (not shown), be inserted through the open end of ring 70 and against collar 66 to force valve stem 67 upwardly against the action of compression spring 65 to thereby raise valve 55 off its seat. As valve 55 is moved off its seat, stem 54 is moved upwardly in passage 49 until the top of the stem contacts pin 52. With stem 54 in this position, mandrel 23 is replaced on tubular member 26. As the mandrel is screwed on member 26, stem 33 contacts upper valve stem 29 at its top 32 and forces stem 29 downwardly against the action of compression spring 28. The downward movement of stem 29 moves valve 36 off its seat, and moves stem 53 downwardly in passage 49 where the stem contacts pin 51. Further downward movement of valve 36 and stem 53 causes pin 51 to move downwardly in groove 50. As pin 51 is secured to outer member 45, the outer member will be forced downwardly against the compressive force of spring 45. As the groove 59 in stem 54 is now opposite passages 56, the downward movement of the outer member 45 urges balls 58 from recesses 57 into the groove. When mandrel 23 is completely connected to member 26, valve 36 will be fully open and outer member 45 will be at its lower limit of travel where it fully covers the outer ends of passages 56, projecting balls 58 into groove 59, and thus preventing downward movement of stem 54. The relative position of the parts of my device is illustrated in Figure 1 with both valves 36 and 55 fully open. A wire line (not shown) is inserted through bore 15 during the assembly operation.

The device is then lowered into the well bore to a predetermined depth where a fluid sample is obtained in chamber 12. Due to the relatively small mass of jarring member 10 and the large mass of the rest of the device, it is possible by means of the wire line to jar the device sufficiently to shear pin 34, allowing stem 33 to move into bore 25, releasing stem 29 which is now free to be moved upwardly in chamber 11 by spring 28. Stem 29 moves upwardly until valve 36 is fully closed as shown in Figure 4. Stem 53 is also moved upwardly by the force of spring 28, freeing pin 51 which has been depressed in the bottom of passage 50 by the lower end of stem 53. With pin 51 free, spring 46 forces outer member 45 upwardly until recesses 57 are opposite passages 56. When outer member 45 assumes this relative position with inner member 43, valve mechanism 42 is unlocked. Balls 58, which held stem 54 in a fixed position against the force of compression spring 65 by protruding into groove 59, are urged from the arcuate groove into their respective passages 56 and recesses 57. Stem 54 then moves downwardly in passage 49, due to the action of spring 65, until lower valve 55 is fully closed. With valves 36 and 55 closed, the fluid sample is now procured and the sampling device is ready to be withdrawn from the well bore.

It will be noted that compression springs 28 and 65 are of sufficient strength to hold valves 36 and 55, respectively, firmly enough on their seats to prevent leakage of fluid from chamber 12. As valve inserts 38 and 62 are resilient and distortable, any solid materials entrained in the well fluid will be depressed into the valve insert by the force of the springs, completely sealing the valve. This positive action is highly desirable for obtaining fluid samples from low pressure formations. If the sample of fluid obtained is from a high pressure formation, the pressure of the fluid in chamber 12 will force the valves tighter on their seats as the device is withdrawn from the well bore and the pressure on the outside of the device decreases.

From the foregoing, it is believed that the construction, operation and advantages of my present invention will be readily comprehended by persons skilled in the art. It is to be understood that the form of this invention, herewith shown and described, is to be taken as a preferred example of the same and that various changes in size, shape and arrangement of parts may be resorted to without departing from the spirit of this invention as defined by the appended claims.

I claim:

1. In a device for obtaining representative samples of fluid from a well bore, the combination comprising a housing, a pair of valve seats spaced one above the other within the housing and forming a fluid chamber therebetween, a pair of valve members cooperating with the valve seats to form fluid seals therewith, a chamber above the upper valve seat and a chamber below the lower valve seat, means within the two last mentioned chambers for normally urging each valve member into closed position, and detent means including a destructible member for maintaining the valve members in open positions against the action of the first mentioned means.

2. In a device for obtaining representative samples of fluid from a well bore, the combination comprising a housing, a pair of valve seats spaced one above the other within the housing and forming a fluid chamber therebetween, a pair of valve members cooperating with the valve seats to form fluid seals therewith, a chamber above the upper valve seat and a chamber below the lower valve seat, means within the two last mentioned chambers for normally urging each valve member into closed position, and detent means including a shearable member for maintaining the valve members in open positions against the action of the first mentioned means.

3. In a device for obtaining representative samples of fluid from a well bore, the combination comprising a housing, a pair of valve seats spaced one above the other within the housing and forming a fluid chamber therebetween, a pair of valve members cooperating with the valve seats to form fluid seals therewith, a chamber above the upper valve seat and a chamber below the lower valve seat, means within the two last mentioned chambers for normally urging each valve member into closed position, and detent means including a slidable member and a shear member associated therewith for maintaining the valve members in open positions against the action of the first mentioned means.

4. In a device for obtaining representative samples of fluid from a well bore, the combination comprising a housing, a pair of valve seats spaced one above the other within the housing and forming a fluid chamber therebetween, a pair of valve members cooperating with the valve seats to form fluid seals therewith, a chamber above the upper valve seat and a chamber below the lower valve seat, means including a spring and a valve stem in each of the two last mentioned chambers for normally urging each valve member into closed position, and detent means including a destructible member for maintaining the valve members in open position against the action of the first mentioned means.

5. In a device for obtaining representative samples of fluid from a well bore, the combination comprising a housing, a pair of valve seats spaced one above the other within the housing and forming a fluid chamber therebetween, a pair of valve members cooperating with the valve seats to form fluid seals therewith, a chamber above the upper valve seat and a chamber below the lower valve seat, means including a spring and a valve stem in each of the two last mentioned chambers for normally urging each valve member into closed position, and detent means including a shearable member for maintaining the valve members in open positions against the action of the first mentioned means.

6. In a device for obtaining representative samples of fluid from a well bore, the combination comprising a housing, a pair of valve seats spaced one above the other within the housing and forming a fluid chamber therebetween, a pair of valve members cooperating with the valve seats to form fluid seals therewith, a chamber above the upper valve seat and a chamber below the lower valve seat, means including a spring and a valve stem in each of the two last mentioned chambers for normally urging each valve member into closed position, and detent means including a slidable member and a shear member associated therewith for maintaining the valve members in open position against the action of the first mentioned means.

7. In a device for obtaining representative samples of fluid from a well bore, the combination comprising a housing, a pair of valve seats spaced one above the other within the housing and forming a fluid chamber therebetween, a pair of valve members cooperating with the valve seats to form fluid seals therewith, a chamber above the upper valve seat and a chamber below the lower valve seat, means within the two last mentioned chambers for normally urging each valve member into closed position, detent means including a destructible member for maintaining the valve members in open positions against the action of the first mentioned means, and suspension means connected to the housing and including a member movable with respect to the housing in response to sudden jerking of the device through the suspension means for effecting destruction of the destructible member and release of the valve members.

8. In a device for obtaining representative samples of fluid from a well bore, the combination comprising a housing, a pair of valve seats spaced one above the other within the housing and forming a fluid chamber therebetween, a pair of valve members cooperating with the valve seats to form fluid seals therewith, a chamber above the upper valve seat and a chamber below the lower valve seat, means within the two last mentioned chambers for normally urging each valve member into closed position, detent means including a shearable member for maintaining the valve members in open position against the action of the first mentioned means, and suspension means connected to the housing and including a member movable with respect to the housing in response to sudden jerking of the device through the suspension means for effecting a shearing of the shearable member and release of the valve members.

9. In a device for obtaining representative samples of fluid from a well bore, the combination comprising a housing, a pair of valve seats spaced one above the other within the housing and forming a fluid chamber therebetween, a pair of valve members cooperating with the valve seats to form fluid seals therewith, a chamber above the upper valve seat and a chamber below the lower valve seat, means within the two last mentioned chambers for normally urging each valve member into closed position, detent means including a slidable member and a shear member associated therewith for maintaining the valve members in open positions against the action of the first mentioned means, and suspension means connected to the housing and including a member movable with respect to the housing in response to sudden jerking of the device through the suspension means for effecting shearing of the shear member and release of the valve members.

ROBERT C. PRYOR.